United States Patent [19]
Anderson

[11] Patent Number: 4,733,345
[45] Date of Patent: Mar. 22, 1988

[54] COMPUTER-TELEPHONE SECURITY DEVICE

[76] Inventor: Paul D. Anderson, 1302 Westchester Ct., Mahomet, Ill. 61853

[21] Appl. No.: 759,689

[22] Filed: Jul. 29, 1985

[51] Int. Cl.$^4$ .............................................. G06F 7/04
[52] U.S. Cl. ..................................... 380/25; 364/200; 379/95
[58] Field of Search ... 364/200 MS File, 900 MS File; 455/26

[56] References Cited

U.S. PATENT DOCUMENTS

| | | | |
|---|---|---|---|
| 3,984,637 | 10/1976 | Caudill et al. | 364/200 X |
| 4,218,738 | 8/1980 | Matyas et al. | 364/200 |
| 4,264,782 | 4/1981 | Konheim | 364/200 X |
| 4,310,720 | 1/1982 | Check, Jr. | 364/900 X |
| 4,430,728 | 2/1984 | Beitel et al. | 364/900 |
| 4,450,535 | 5/1984 | de Pommery et al. | 364/900 |
| 4,475,175 | 10/1984 | Smith | 364/900 |

OTHER PUBLICATIONS

C. Gillard and J. Smith, "Computer Crime: A Growing Threat," Byte, (Oct. 1983).
C. Mueller-Schloer, "DES-Generated Checksums for Electronic Signatures," Crypotologia, (Jul. 1983).
M. Hellman, "The Mathematics of Public-Key Cryptography," Scientific American, (Aug. 1979).
R. Rivest, A. Shamir & L. Adleman, "A Method for Obtaining Digital Signatures and Public-Key Cryptosystems," Ass'n for Computing Machinery Communications, vol. 21, (1978).
"Data Encryption Standard," Federal Information Processing Standards Publication, 46, (Jan. 15, 1977).
L. Ackland, "Black Box Blocks Computer Thieves," Chicago Tribune (1-19-84).
W. Martorelli, "Gould Software Unit Readies Security System," Information System News, (Jul. 9, 1984).

Primary Examiner—Thomas M. Heckler
Attorney, Agent, or Firm—Barnes & Thornburg

[57] ABSTRACT

A computer access security system controls access to a host computer from a remote terminal. The security system has a control code deriving device for deriving a control code and a subordinate access code deriving device for deriving a subordinate access code. The security system permits the remote terminal to access the host computer when the control access code matches the subordinate access code.

12 Claims, 11 Drawing Figures

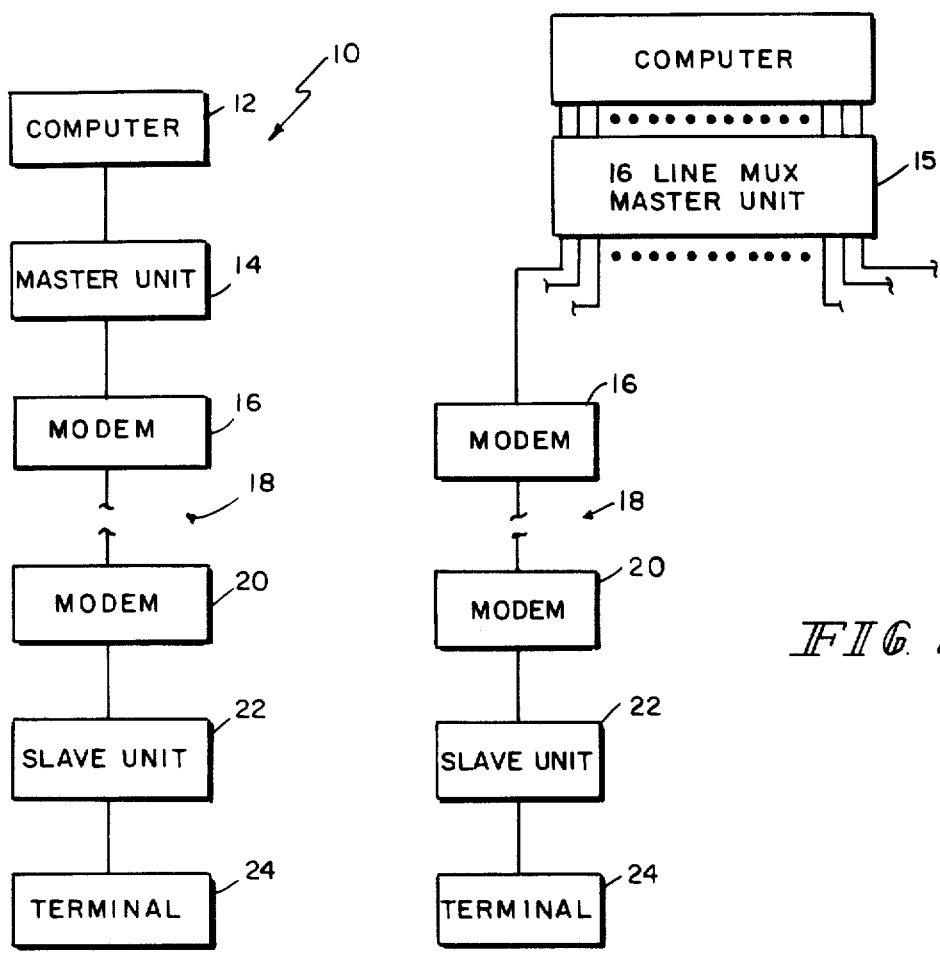
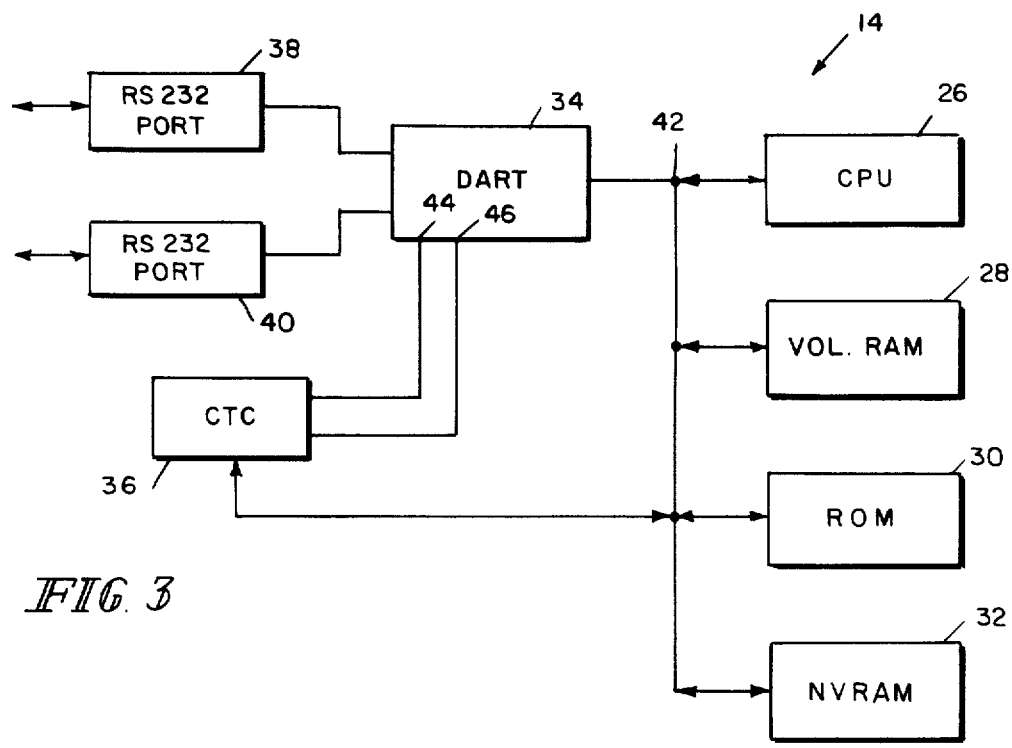
FIG. 1
FIG. 2
FIG. 3

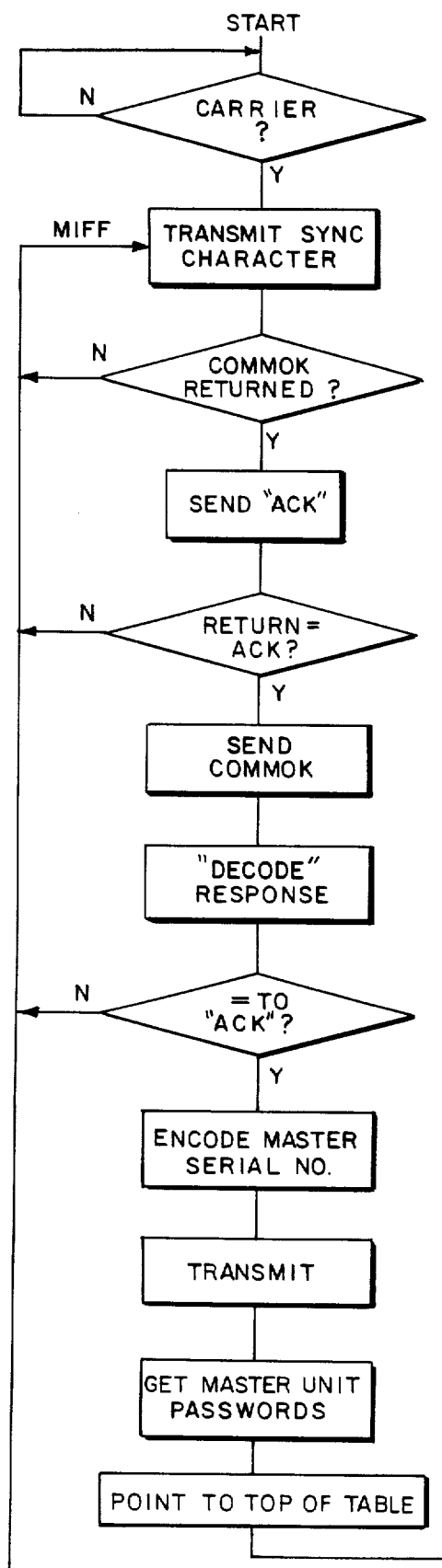
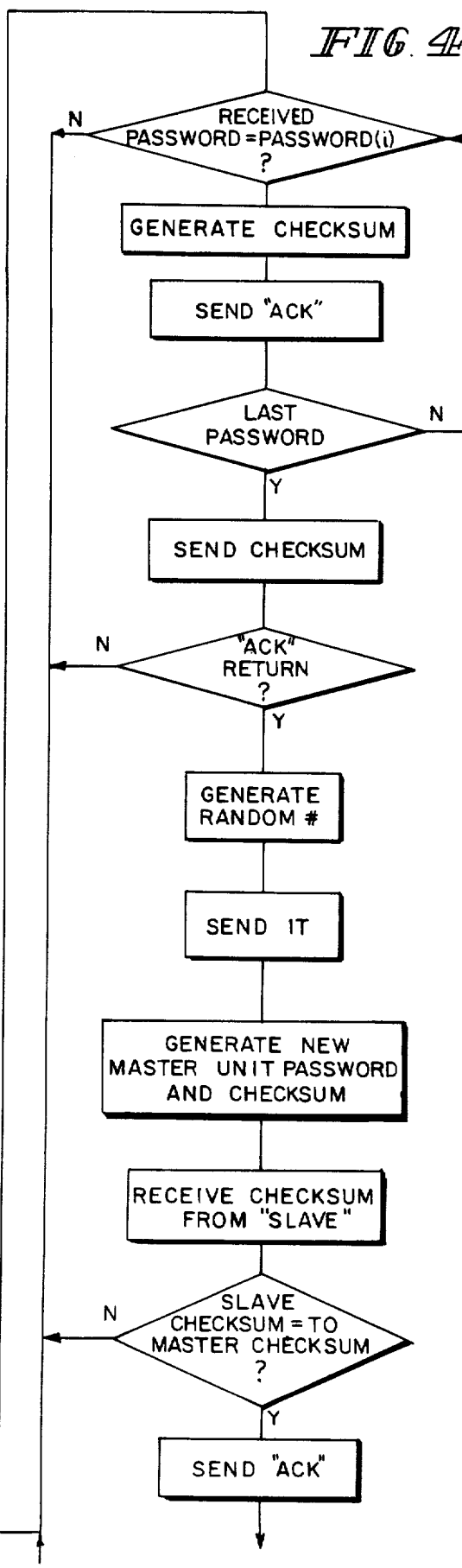
FIG. 4a

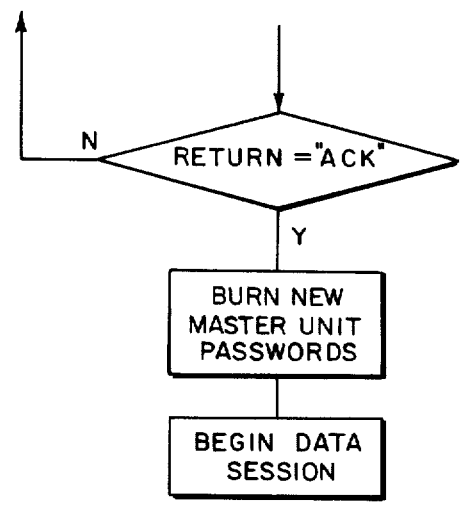
FIG. 4b
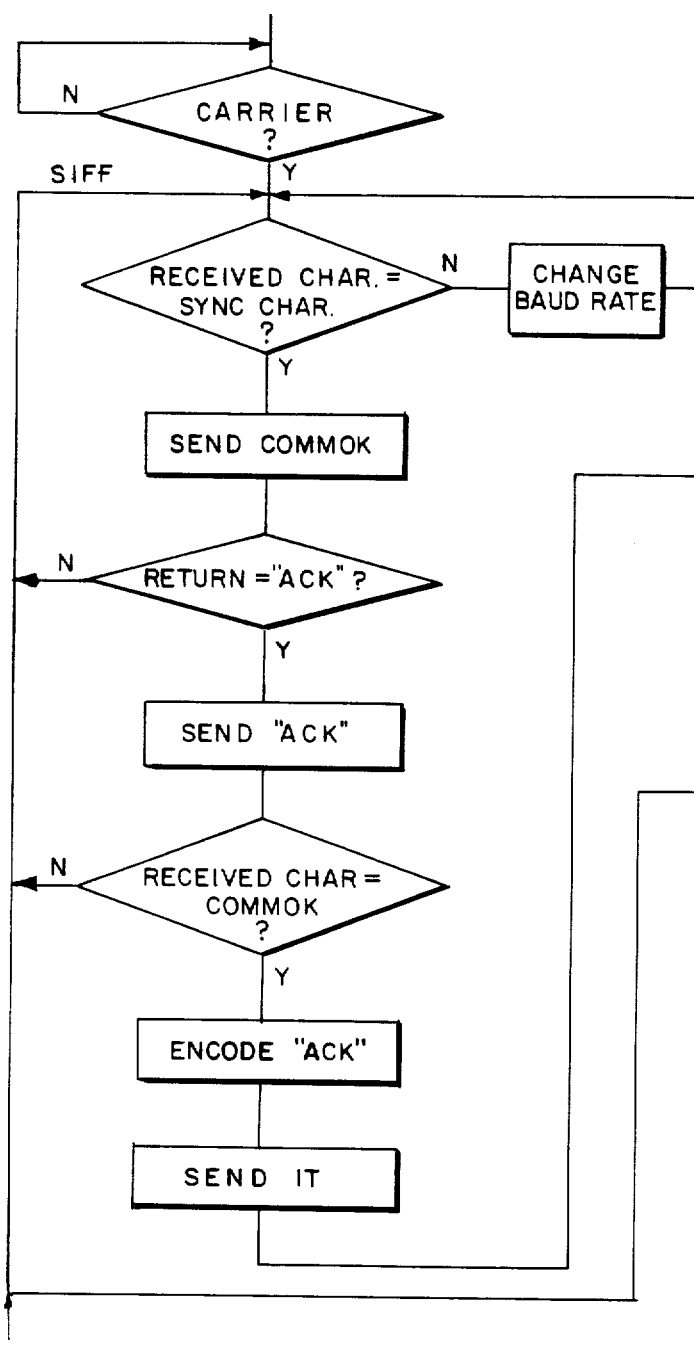
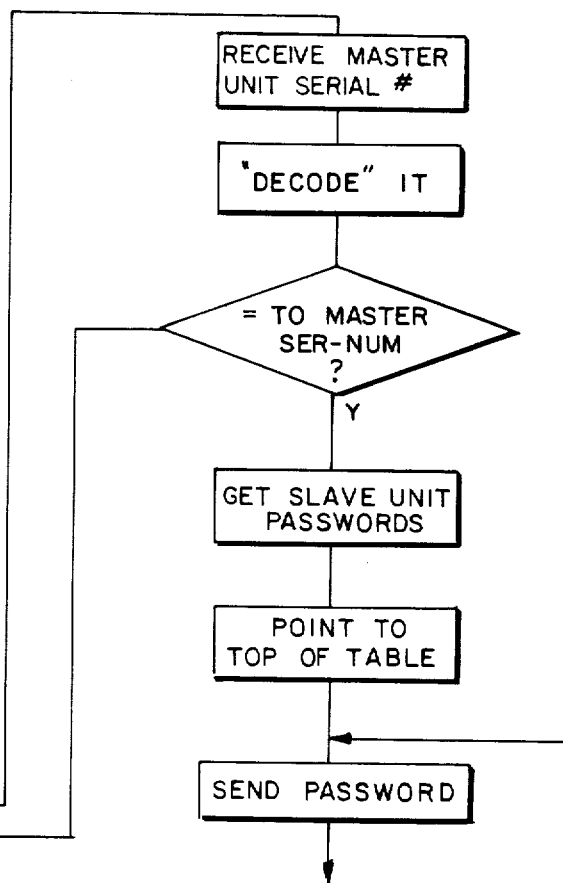
FIG. 5a

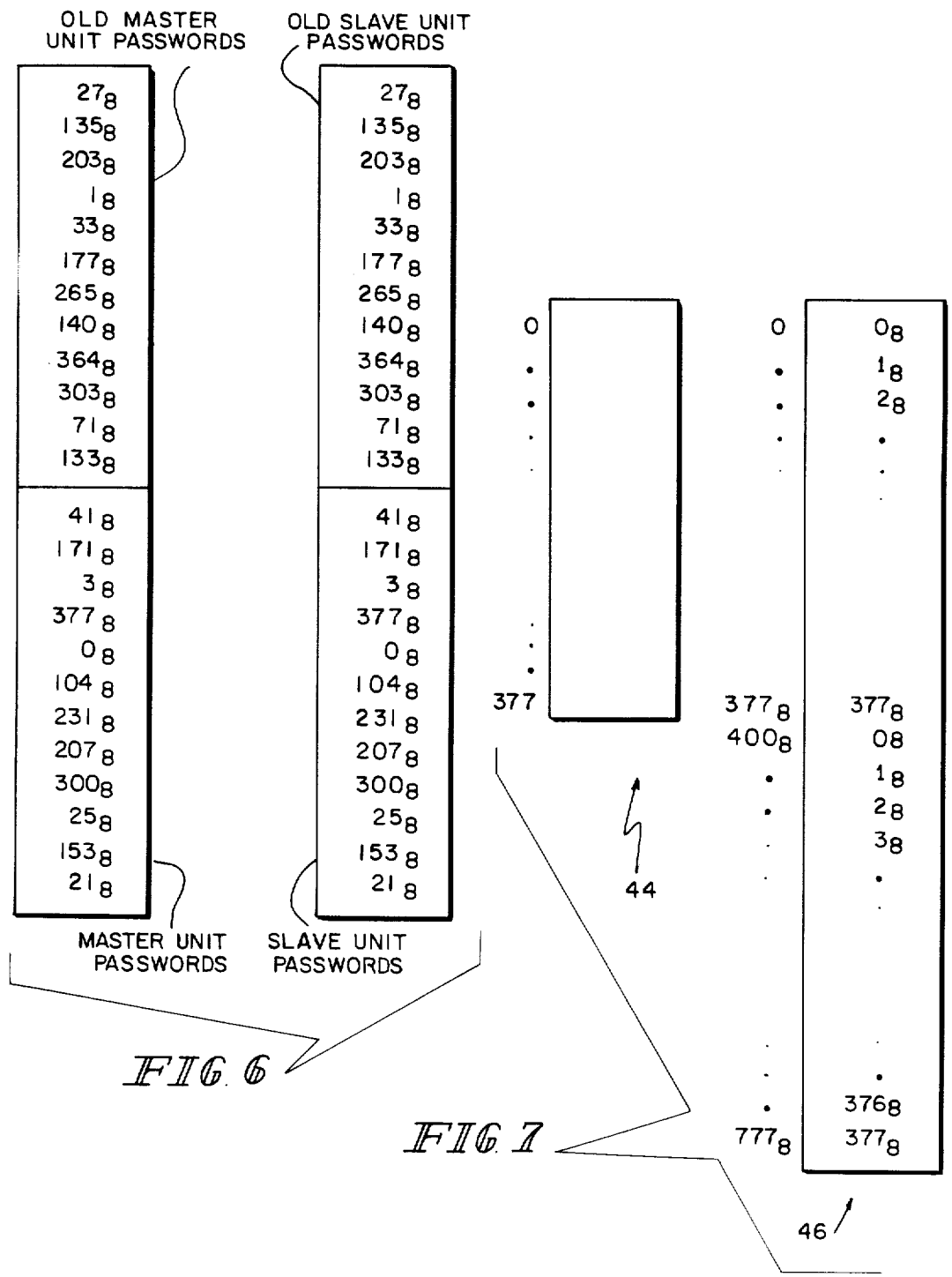

COMPUTER-TELEPHONE SECURITY DEVICE

This invention relates to security devices for computers and more particularly to a security device for permitting only authorized access to a computer system.

With the growing use of large, multi-user computer systems by virtually every sector of society, the problem of unauthorized access to the computer system has grown proportionally. The popular press has reported numerous instances of "break-ins" to supposedly secure computer systems by those unauthorized to access the computer system. In fact, these unauthorized users have even started calling themselves "hackers" and have devoted a fair amount of time and effort in attempting to gain access to secure computer systems. In many cases, these "hackers" attempt to gain access to the computer system merely to show that they can do so. However, the access by an unauthorized user, even one with no destructive intent, has often resulted in the destruction of valuable data, programs, or both that are stored in the computer system.

Illustrative of the problems faced by computer system users, are the problems faced by the finance and banking industry. Every working day, billions of dollars are transferred among various financial institutions by the exchange of data among the computer systems of the financial institutions. Consequently, an unauthorized user who gains access to a computer system used by a financial institution could abscond with large sums of money merely by interferring with and disdirecting the flow of data from one computer to another. Additionally, an unauthorized user wishing to cripple or destroy an institution could gain access to the institution's computer system and cause many millions of dollars worth of data and programs to be destroyed.

The problem of unauthorized users becomes particularly acute when the computer system is configured to communicate over phone lines with authorized users. With this type of situation, an unauthorized user can find out the phone number of the computer, dial it up, and gain access to the computer system. In many cases, the security techniques used to prevent unauthorized access are rudimentary and have posed little or no problems to an unauthorized user wishing to gain access to the system.

A commonly used technique for preventing access by anauthorized users is to assign each authorized user a password. A list of these passwords is stored on the computer system and each time a user attempts to log-on to the computer system, he must first enter his password. The computer then checks the password against the passwords stored in its list and permits access only if the passwords match.

This type of security system has proven to be unsuccessful in preventing unauthorized access. With the advent of powerful home computer systems, the would be unauthorized user need merely program his home computer system to sequentially try every possible password. In short order, a successful password is usually found and the unauthorized user is logged onto the system.

It is an object of the instant invention to provide an improved computer access security device for prevention of unauthorized access to a computer system.

It is another object of the instant invention to provide an improved computer security device for preventing unauthorized access to the computer system that is completely transparent to the user.

It is a further object of the instant invention to provide an improved computer security access device for prevention of unauthorized access to the system that is virtually impossible to duplicate.

In accordance with the instant invention, a computer acceess security system for authorizing access to a host computer from a remote terminal is provided. The computer access security system comprises subordinate means for communicating with a control means to obtain access to the host computer. The subordinate means is coupled to the remote terminal and the control means is coupled to the host computer. The control means controls access to the host computer. The subordinate means includes means for deriving at least one subordinate access code from the subordinate access data. The control means includes means for deriving at least one control access code from the control access data. Means is provided for comparing the control access code to the subordinate access code and permitting the remote terminal to access the host computer when the control access code matches the subordinate access code.

Additional features and advantages of the invention will become apparatent to those skilled in the art upon consideration of the following detailed description of a preferred embodiment exemplifying the best mode of carrying out the invention as presently perceived. The detailed description particularly refers to the accompanying figures in which:

FIG. 1 is a block diagram showing the invention connected to a computer system;

FIG. 2 is a block diagram showing multiple security devices of the invention coupled in a computer system;

FIG. 3 is a block diagram of the invention;

Figure 5B:
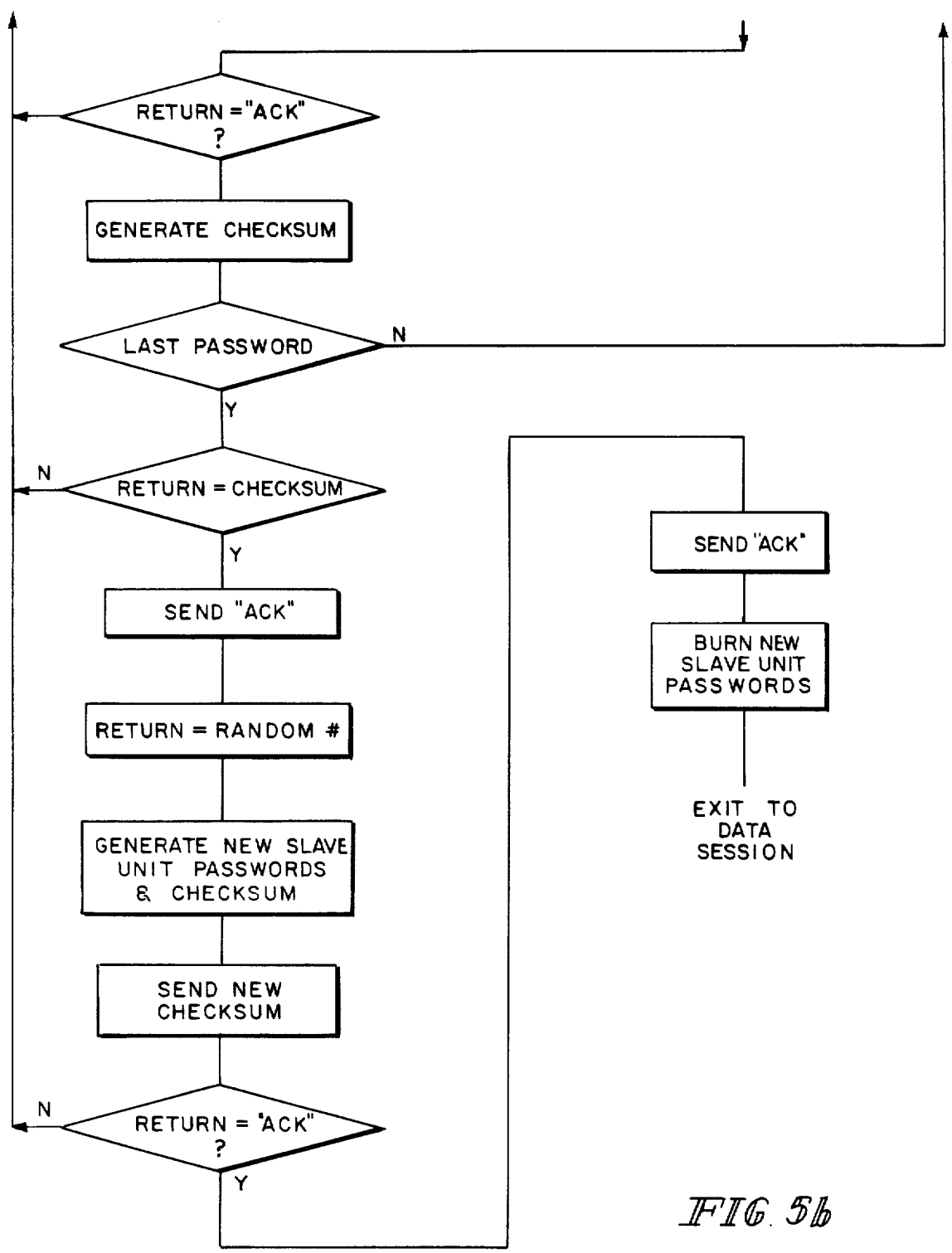

FIGS. 4a–b are a flow chart showing a routine for the "master" portion of the invention;

FIGS. 5a–b are a flow chart showing a routine for the "slave" portion of the invention;

FIG. 6 is a set of tables of the "old" and "new" passwords for the "master" and "slave" units of the invention.

FIG. 7 is a set of tables used for encryption and decryption; and

Figure 8A:
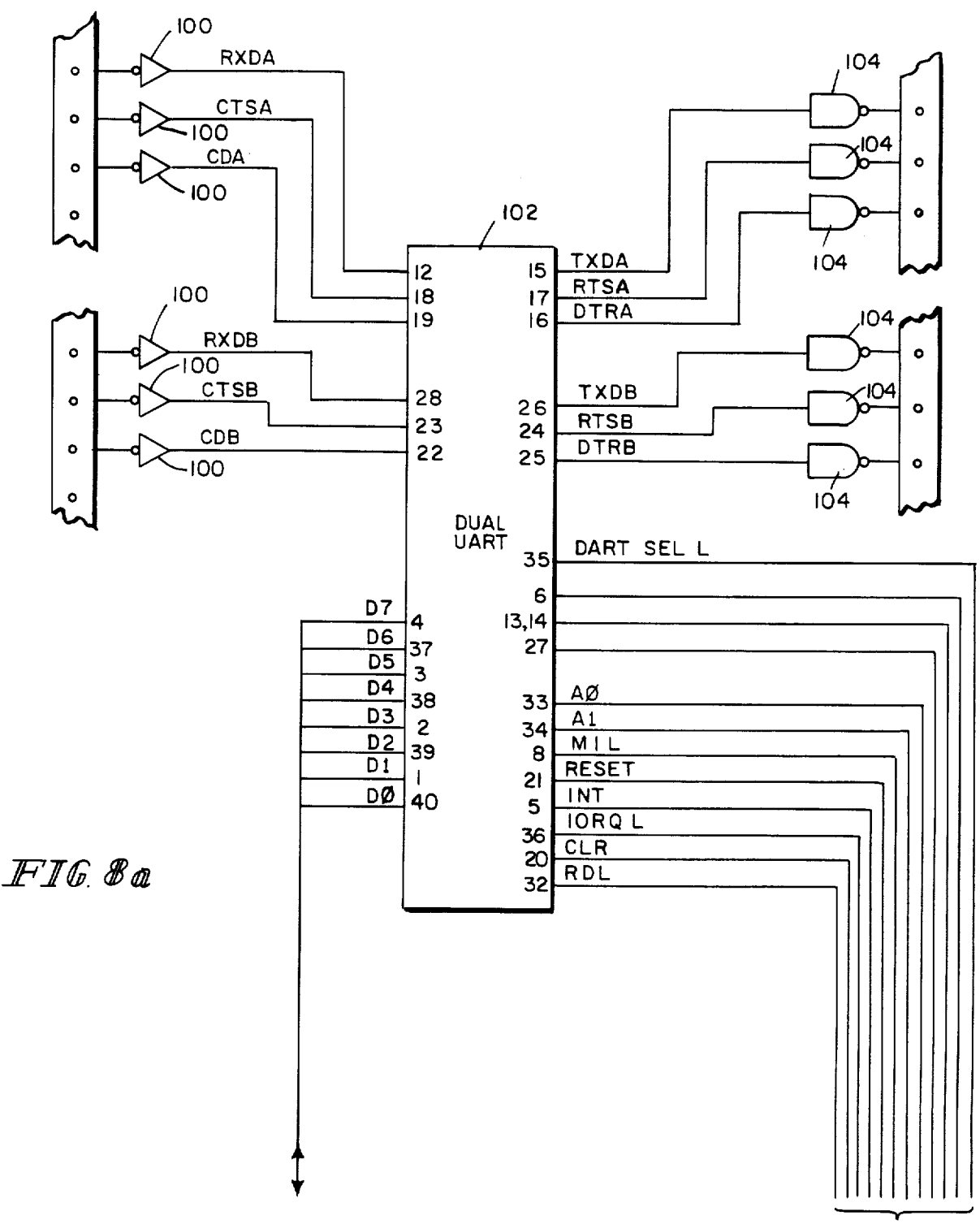
Figure 8B:
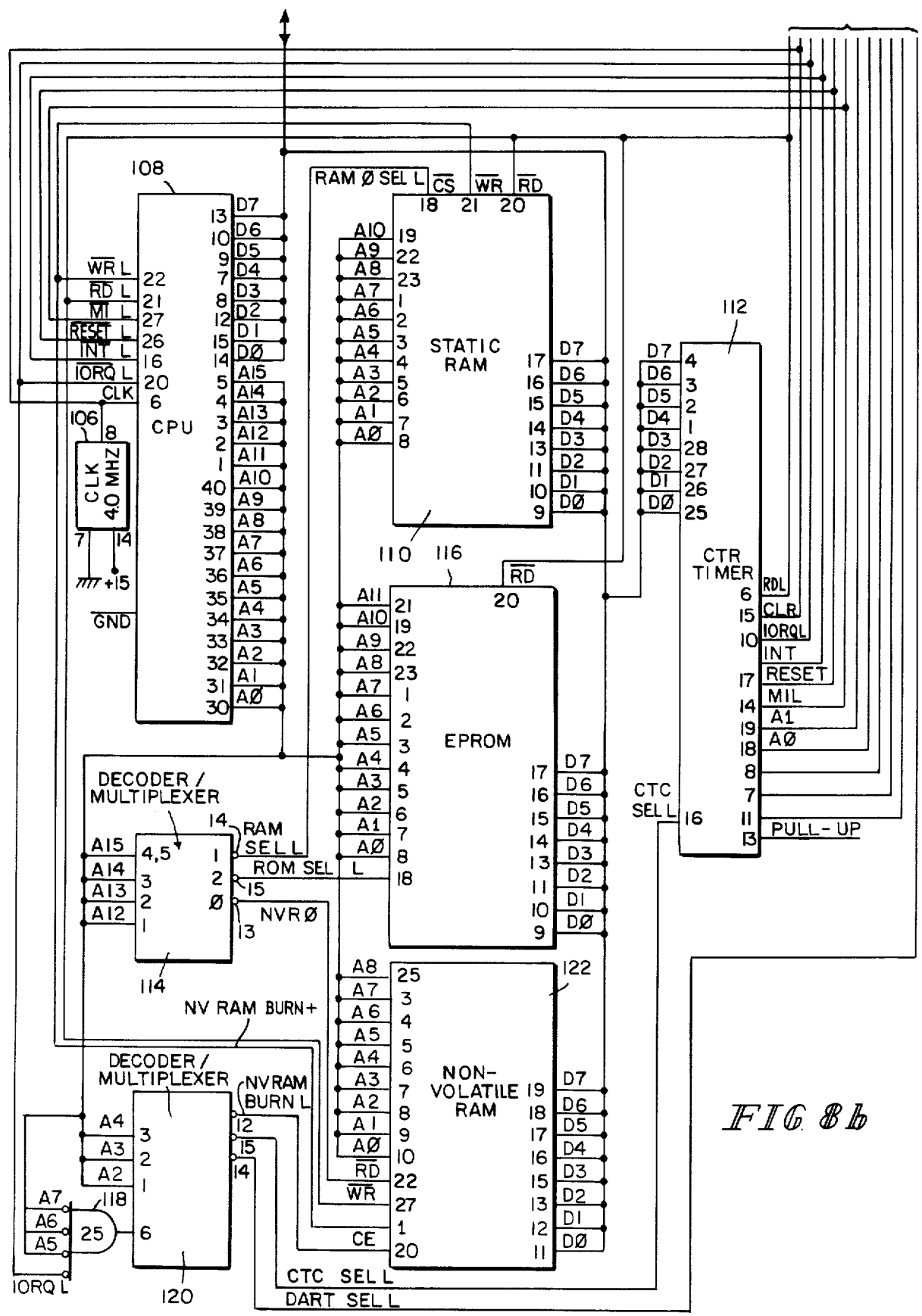

FIGS. 8a–b are a schematic of a working embodiment of the invention as presently known to the inventor.

Referring to FIG. 1, a computer system 10 including the computer security access device of the instant invention is shown. The computer system 10 includes computer 12 which is coupled to master unit 14. Master unit 14 is coupled to modem 16. Modem 16 is coupled by means 18 to modem 20. Coupling means 18 could illustratively be phone lines.

Modem 20 is coupled to slave unit 22 and slave unit 22 is coupled to remote terminal 24. Remote terminal 24 is illustratively a CRT with keyboard. Master unit 14 and slave unit 22 cooperate to provide a computer security access device of the instant invention as will be described in more detail later. It should be understood that the term "remote terminal" is being used in a broad sense and remote terminal 24 can be any type of device which can access a computer system, such as another computer, and is not limited to CRT's.

FIG. 2 shows a modification to the computer security access device of the instant inveniton. Master unit 14 (FIG. 1) illustratively comprises master multiplexer unit 15 for providing a plurality of ports for coupling a plurality of remote terminals. In this embodiment, the master multiplexer unit 15 would be the equivalent of a plurality of individual master units 14 packaged together. In the embodiment shown in FIG. 2, master multiplexer unit 15 would comprise the equivalent of 16 individual master units 14 of FIG. 1. It should be understood that each of the master units is separate and unique and in no way interacts with the other master units in the multiplexer 15.

Referring to FIG. 3, a block diagram of master unit 14 is shown. It should be understood that a block diagram for slave unit 22 would be identical to the block diagram for master unit 14. Therefore, only the block diagram for master unit 14 will be described.

Master unit 14 includes a central processing unit (CPU) 26, a volatile random-access-memory (RAM) 28, a read-only-memory (ROM) 30 and a non-volatile random-access-memory (NVRAM) 32. Master unit 14 also includes a dual asynchronous receiver/transmitter (DART) 34, a counter/timer chip (CTC) 36, a first RS232 port 38 and a second RS232 port 40. CPU 26, volatile RAM 28, ROM 30, NVRAM 32, DART 34 and CTC 36 are all coupled to a common bus 42. DART 34 further has a baud rate input 44, which determines the baud rate at which DART 34 communicates with RS232 port 38, and a baud rate input 46, which determines the baud rate at which DART 34 communicates with RS232 port 40. Illustratively, RS232 port 38 would be coupled to computer 12 (FIG. 1) and RS232 port 40 would be coupled to modem 16 (FIG. 1). If the unit shown in FIG. 3 was a slave unit 22, RS232 port 38 would illustratively be coupled to remote terminal 24 (FIG. 1) and RS232 port 40 would be coupled to modem 20 (FIG. 1).

FIG. 4 is a flow chart of an illustrative program which implements the security access functions of master unit 14. Illustratively, the program would be stored in ROM 30 and would be executed by CPU 26 which utilizes volatile RAM 28, NVRAM 32 and CTC 36 as needed. FIG. 5 is a flow chart of an illustrative program which implements the security access functions of slave unit 22. Again, CPU 26 would execute a program stored in ROM 30 using volatile RAM 28, NVRAM 32 and CTC 36 as needed. Illustratively, the sequencey by which the remote terminal 24 gains access to host 12 will be referred to as a "log-on" sequence.

Referring to FIGS. 4 and 5, both the master unit 14 and slave unit 22 are initially in a wait state where they are looping waiting for a modem 16, 20, respectively, to detect the presence of a carrier. Referring to FIG. 4, after modem 16, to which master unit 14 is connected, detects a carrier, master unit 14 transmits a sync character stored in its ROM 30 to slave unit 22. After modem 20, to which slave unit 22 is connected, detects a carrier, slave unit 22 puts itself in a receive state and waits for a character to be transmitted to it from master unit 14. Once slave unit 22 receives a character, it compares it to the sync character which is stored in its ROM 30. If the received character does not match the sync character, slave unit 22 changes its baud rate and then waits for another character to be sent from master unit 14. If the received character does match the sync character, slave unit 22 will send back to master unit 14 a communications OK (COMMOK) character which is stored in its ROM 30.

Referring to FIG. 4, after master unit 14 transmits the sync character to slave unit 22, it puts itself in a receive state and waits for slave unit 22 to send a character back to it. Once master unit 14 receives a character from slave unit 22, it checks to see if it is the COMMOK character. If the character received from slave unit 22 is not the COMMOK character or, in the case where the sync character sent from master unit 14 does not match the sync character stored in ROM 30 of slave unit 22, master unit 14 will again transmit the sync character to slave unit 22. Master unit 14 will continue transmitting sync characters to slave unit 22 until it receives the COMMOK character from slave unit 22 or a predetermined time expires or it transmits a predetermined number of sync characters. If this happens, master unit 14 will cease attempting to communicate with slave unit 22 and will go back to the point where it is awaiting the detection of a carrier by modem 16.

Once master unit 14 receives the COMMOK character from slave unit 22, it transmits the ACK character to slave unit 22. Referring to FIG. 5, once slave unit 22 has sent the COMMOK character to master unit 14, it puts itself in the receive mode and waits for a character to be returned from master unit 14.

Once slave unit 22 receives a return character from master unit 14, slave unit 22 checks to see if this return character is the ACK character. If the character returned from master unit 14 is not the ACK character, slave unit 22 returns to the point where it is expecting the sync character to be sent from master unit 14. This is indicated by the label SIFF which, illustratively, stands for Slave Identification Friend or Foe. If the returned character from master unit 14 is the ACK character, slave unit 22 will then send the ACK character to master unit 14.

Referring now to FIG. 4, once master unit 14 has sent the ACK character to slave unit 22, it puts itself in the receive mode and waits for a character to be returned from slave unit 22. Once it receives a returned character from slave unit 22, master unit 14 checks to see if the returned character is the ACK character. If the returned character is not the ACK character, master unit 14 returns to the point where it is transmitting the sync character to slave unit 22. This is illustratively labeled as MIFF which stands for Master Identification Friend or Foe. If the returned character from slave unit 22 is the ACK character, master unit 14 will then send the COMMOK character to slave unit 22.

Referring to FIG. 5, once slave unit 22 has sent the ACK character to master unit 14, it puts itself in the receive mode and waits for a character to be sent to it from master unit 14. Once it receives a character from master unit 14, it checks to see if the received character is the COMMOK character. If it is not, slave unit 22 returns to SIFF. If the received character is the COMMOK character, slave unit 22 encodes the ACK character. The ACK character can be encoded in a variety of different ways provided that the associated decode routine in the master unit will be the inverse of the encode routine in the slave unit so that when the master receives an encoded ACK character, it can decode it to result in the ACK character. In context of this application, ACK is one of the standard ASCII characters and is illustratively held in an 8 bit word. To encode the ACK, the 8 bit word could illustratively be shifted right three times and then complemented. Any such encoding algorithm is sufficient provided only that the decode routine in the master is its inverse.

Referring to FIG. 4, once master unit 14 has sent the COMMOK to the slave unit 22, it puts itself in the receive mode and waits for slave unit 22 to send it a character. Once master unit 14 receives a response from slave unit 22, it decodes the response. As discussed, the decode routine stored in master unit 14 and used to decode the response is the inverse of the encode routine stored in slave unit 22. After decoding the response, master unit 14 checks the decoded character to determine if it is the ACK character. If it is not, the master unit 14 routine returns to MIFF. If the decoded character is the ACK character, master unit 14 encodes its serial number, which is stored in its ROM 30, and then transmits it to slave unit 22. The routine used to encode the master serial number is the same type of routine that slave unit 22 used to encode the ACK character. Again, the important aspect of the routine used to encode the master serial number is that slave 22 must have a routine for decoding the encoded master serial number sent to it from master unit 14 to produce the master serial number. With this limitation in mind, basically any routine can be used to encode the master serial number.

Referring back to FIG. 5, once slave unit 22 has sent the encoded ACK to master unit 14, it again puts itself in the receive mode and awaits the next character. Once slave unit 22 gets the next character from master unit 14, it decodes it. Again, the routine used to decode this character will be the inverse of the routine in master unit 14 which is used to encode the master serial number. After decoding the character received from master unit 14, slave unit 22 checks to see if the decoded character is the master serial number which is stored in ROM 30 of slave unit 22. It should be understood that the master serial number could comprise a plurality of characters and that master unit 14 would encode each of the characters comprising the master serial number, send them to slave unit 22, which would then decode each of the characters it receives from master unit 14 to generate the characters to be compared to the prestored master serial number.

If the received character is not the master serial number, slave unit 22 returns to SIFF. If the received character is the master serial number, slave unit 22 moves to the next step of the routine wherein it gets the slave unit passwords. Illustratively, master unit 14 has a table containing 12 old master unit passwords and 12 master unit passwords and slave unit 22 has a table containing 12 old slave unit passwords and 12 slave unit passwords. Referring to FIG. 6, the table for master unit 14 has 12 octal numbers which comprise the old master unit passwords and 12 octal numbers which comprise the master unit passwords. The table for slave unit 22 contains 12 octal numbers which comprise the old slave unit passwords, which are identical to the old master unit passwords, and also contains 12 octal numbers which comprise the slave unit passwords, which are identical to the master unit passwords. Therefore, when slave unit 22 gets the slave unit passwords, it sets up a pointer to the beginning of the table containing the slave unit passwords. This pointer indicates the address from which slave unit 22 fetches a slave unit password. After fetching a slave unit password, slave unit 22 sends it to the master unit.

Referring back to FIG. 4, after master unit 14 has transmitted the encoded master serial number to slave unit 22, it gets the master unit passwords in the same manner that slave unit 22 does. It then waits to receive a slave unit password sent to it from slave unit 22. Once master unit 14 receives a slave unit password from slave unit 22, it compares it to the master unit password which its pointer is pointing to. If the received slave unit password does not match the master unit password being pointed to, master unit 14 returns to MIFF. If the received slave unit password does match the master unit password being pointed to, master unit 14 generates a checksum using the received password, and sends the ACK character to slave unit 22. It then checks to determine if the last slave unit password has been sent to it from slave unit 22. If it has not, master unit 14 increments its pointer by one and returns to the point where it is awaiting receipt of the next slave unit password from slave unit 22. If it was the last slave unit password, master unit 14 then sends the checksum which it generated from the received passwords to slave unit 22.

Returning to FIG. 5, after slave unit 22 has sent the slave unit password to master unit 14, it awaits the return of the ACK character from master unit 14. Upon receipt of a character, slave unit 22 checks to see if it is the ACK character. If it is not, slave unit 22 returns to SIFF. If the return character is the ACK character, slave unit 22 generates a checksum using the slave unit password it sent to master unit 14. Next, slave unit 22 checks to determine if the last slave unit password has been sent. If it has not, slave unit 22 indexes its pointer by one and fetches the next slave unit password from the table. If the last slave unit password has been sent, slave unit 22 next awaits the transmission of a checksum from master unit 14. Upon receipt of the checksum, slave unit 22 checks the checksum returned from master unit 14 to the checksum which it generated. If the checksums do not match, slave unit 22 returns to SIFF. If the checksums do match, slave unit 22 sends the ACK character to master unit 14. It should be understood that the master unit passwords can be combined in some other fashion than by generating a checksum from the master unit passwords, as can be the slave unit passwords, as long as the master unit passwords are combined in the same way as the slave unit passwords.

Returning back to FIG. 4, after master unit 14 has sent the checksum to slave unit 22, it awaits the return of the ACK character from slave unit 22. Upon receipt of a character from slave unit 22, master unit 14 checks to see if the ACK character was returned. If it was not, master unit 14 returns to MIFF. If the ACK character was returned from slave unit 22, master unit 14 then generates a random number. After generating the random number, master unit 14 sends it to slave unit 22. After sending the random number to slave unit 22, master unit 14 then generates a new set of 12 passwords using the random number as a seed. Illustratively, master unit 14 has 12 algorithms which each operate on the random seed number to generate new master unit passwords. Illustratively, one such algorithm might be to shift the seed number left twice, add five to it, and shift the result four places to the right. It should be understood that any algorithm which operates on the seed number to generate a number is sufficient to generate a new master unit password from the seed number. Master unit 14 also generates a checksum from the newly generated passwords. This checksum is illustratively termed a "control access code." Next, master unit 14 waits to receive a character from slave unit 22.

Returning to FIG. 5, after slave unit 22 has sent the ACK character to master unit 14, it awaits the return of a random number transmitted from master unit 14. Upon receipt of the random number, slave unit 22 utilizes the random number as a seed to generate 12 new slave unit passwords in the same manner that master unit 14 did. It should be understood that the algorithms stored in slave unit 22 which generate the new slave unit passwords must be identical to the algorithms stored in master unit 14 which generate the new master unit passwords. Slave unit 22 also generates a checksum from the newly generated slave unit passwords. After generating the checksum, slave unit 22 sends it to master unit 14.

Returning to FIG. 4, when master unit 14 receives the checksum from slave unit 22, it compares it to the checksum which it generated from the newly created passwords to determine if they match. If they do not match, master unit 14 returns to MIFF. If the received checksum matches the checksum generated by master unit 14, master unit 14 then sends the ACK character to slave unit 22. It should be understood that the new master unit passwords can be combined in ways other than by generating a checksum from the new master unit passwords, as can the new slave unit passwords, as long as the new master unit passwords are combined in the same manner as the new slave unit passwords.

Returning to FIG. 5, after slave unit 22 has sent the checksum it generated from the newly generated passwords to master unit 14, it awaits the return of the ACK character from master unit 14. Upon receipt of a character from master unit 14, slave unit 22 checks to see if it is the ACK character. If it is not, slave unit 22 returns to SIFF. If the return character is the ACK character, slave unit 22 then sends the ACK character to master unit 14. Slave unit 22 now transfers the newly generated passwords from its volatile RAM 28 to its non-volatile RAM 32. Before this is done, referring to FIG. 6, the slave unit passwords in the slave table are written over the old slave unit passwords in the old slave unit password portion of the slave table. The newly generated passwords are then written into the slave unit password portion of the slave table. Slave unit 22 has now completed th log-on sequence and exits to permit remote terminal 24 to begin a data transmission exchange with computer 12.

Returning to FIG. 4, after master unit 14 has sent the ACK character to slave unit 22, it awaits the return transmission of the ACK character from slave unit 22. Upon receipt of a character from slave unit 22, master unit 14 checks to see if the returned character is the ACK character. If the returned character from slave unit 22 is not the ACK character, master unit 14 returns to MIFF. If it is the ACK character, master unit 14 transfers the newly generated passwords from volatile RAM 28 to non-volatile RAM 32. Before this is done, referring to FIG. 6, the master unit passwords in the master table are written over the old master unit passwords in the old master unit password portion of the master table. The newly generated passwords are then written into the master unit password portion of the master table. Master unit 14 has now completed the log-in sequence and allows remote terminal 24 access to computer 12.

The above described invention works on the principle of the one time pad. This means that each time communications is established between a master unit 14 and its associated slave unit 22, the algorithms, which are common to both master unit 14 and slave unit 22, are used to generate a new set of passwords with a one time pad. According to accepted principles of cryptology, a system utilizing a one time pad is the most secure system.

To provide for additional security, slave unit 22 and master unit 14 can also encrypt and decrypt the data being transmitted from remote terminal 26 to computer 12 nd vice versa. It should be understood that the encryption and decryption provides additional security for the computer system but is not necessary to provide the security access device of this invention.

An illustrative encryption/decryption technique that could be utilized by master unit 14 and slave unit 22 is shown with reference to FIG. 7. Each master unit 14 and slave unit 22 include a directory table 44 and a look-up table 46. Table 44 has $377_8$ locations and the code for each possible ASCII character is stored in directory table 44 in random order. The table 44 for a master unit 14 and its associated slave unit 22 must be identical.

Look-up table 46 has $777_8$ locations. Look-up table 46 contains two sequences of all possible ASCII characters wherein each sequence is in increasing numerical order. Therefore, look-up table 46 contains a first sequence of octal numbers from $0_8$ to $377_8$ which are numerically ordered and a second sequence of octal numbers from $0_8$ to $377_8$ which are also numerically ordered.

When master unit 14 or slave unit 22 encodes a character, the character to be encoded is sequentially compared to each location in directory table 44 until a match is found. The character in look-up table 44 which matches the character to be encoded will be at some offset in directory table 44 from 0. This offset is added to the first password of the 12 mster unit or slave unit passwords, respectively. The resulting number is used as a pointer into look-up table 46. The character in look-up table 46 which is at the location indicated by the pointer is the encrypted character to be transferred.

To decrypt a character, the above-described procedure is reversed. Once a character is received, the decryption procedure begins. The first master unit or slave unit password, respectively, is used as an offset into look-up table 46. Beginning from the offset determined by the first master unit or slave unit password, respectively, each location in look-up table 46 is compared to the received character. When a match is found, the difference between the location at which the match is found and the first master unit or slave unit password, respectively, is used as a pointer into directory table 44. The character at the location specified by this pointer will be the decrypted character.

To provide additional security, the master unit or slave unit password, respectively, which is used as the offset can be periodically changed. To accomplish this, the number of characters received can be counted and after a predetermined number have been received, the next master or slave unit password, respectively, in the set of 12 master or slave unit passwords, respectively, is selected as the offset. After the 12th master or slave unit password, respectively, has been used, the next offset selected would be the first master or slave unit password, respectively.

To increase the reliability of the process, after a master unit 14 or a slave unit 22 has transmitted a predetermined number of characters, illustratively, 96, it will transmit four sync characters. The master unit 14 and the slave unit 22 will always be checking each character that they receive to determine if it matches the first sync character. Once a received character matches the first sync character, the master unit 14 or the slave unit 22 then looks to see if the next character received matches the second sync character. If it does not, the master unit 14 or slave unit 22 returns to look for the first sync character. If it does match, the master unit 14 or the slave unit 22 will then check the next character received to determine if it matches the third sync character. If it does not match, the master unit 14 or the slave unit 22 returns to look for the first sync character. If it does match, the master unit 14 or the slave unit 22 will then check to see if the next character received matches the fourth sync character. If it does not, the master unit 14 or the slave unit 22 will return to look for the first sync character. If it does match, the pointer which determines which of the master or slave unit passwords, respectively, is used as the offset is incremented. Consequently, if a character is missed in transmission, the transmission of the four sync characters will resynchronize the master unit 14 and its associated slave unit 22.

It should be understood that the particular encryption/decryption technique used is not a critical part of this invention. Other types of encryption/decryption techniques can be used with the security access device of this invention. Illustratively, the encryption/decryption standard known as the Data Encryption Standard (DES) promulgated by National Bureau of Standards could be utilized.

FIGS. 8a-b are a schematic of a circuit embodying the invention. The interconnections between FIGS. 8a-b can be seen by placing FIG. 8a above FIG. 8b. The following table identifies the chip type used for the port indicated by the reference numeral on the Fig.
100: MC1489 available from Motorola
102: DART available from Zilog
104: MC1488 available from Motorola
106: 4.0 MHz clock available from Connor-Winfield Corp.
108: Z80 available from Zilog
110: HM6116 available from Hitachi
112: CTC available from Zilog
114: 74LS138 available from Texas Instruments
116: 2732 available from Intel
118: 7425 available from Texas Instruments
120: 74LS138 available from Texas Instruments
122: 2004 available from Intel Zilog's address is Cupertino, Calif. Texas Instrument's address is Post Office Box 5012, Dallas, Tex. 75222. Intel's address is 3065 Bowers Avenue, Santa Clara, Calif. 95051.

Although the invention has been described in detail with reference to certain preferred embodiments and specific examples, variations and modifications exist within the scope and spirit of the invention as described and as defined in the following claims.

What is claimed is:

1. A computer access security system for authorizing access to a host computer from a remote terminal, comprising a master unit coupled to the host computer, a slave unit coupled to the remote terminal, the slave unit including means for storing a plurality of slave unit passwords, the master unit including means for storing a plurality of master unit passwords, the slave unit including means for transmitting each slave unit password to the master unit, the master unit including means for comparing the received slave unit passwords with the stored master unit passwords, the master and slave units including means for permitting the remote terminal access to the host computer as a function of a successful comparison of the slave unit passwords received by the master unit with the stored master unit passwords, one of the slave and master units including means for generating access data upon the successful comparison of the slave unit passwords received by the master unit with the stored master unit passwords and transmitting it to the other of the master and slave units, the master unit including means for using the access data to derive a plurality of new master unit passwords and replacing the stored master unit passwords with the new master unit passwords, the slave unit including means for using the access data to derive a plurality of new slave unit passwords identical to the new master unit passwords and replacing the stored slave unit passwords with the new slave unit passwords.

2. The system of claim 1 and further including means for comparing the new master unit passwords with the new slave unit passwords comprising the master unit having means for combining the new master unit passwords, the slave unit having means for combining the new slave unit passwords, one of the master and slave units having means for transmitting its combined new passwords to the other of the master and slave units, the other of the master and slave units including means for comparing the combined new master unit passwords with the combined new slave unit passwords and sending an acknowledgment of the results of the comparison to the transmitting unit, the master and slave units' means for permitting the remote terminal access to the host computer permitting the remote terminal access to the host computer when the received slave unit passwords match the stored master unit passwords and the combined new master unit passwords matches the combined new slave unit passwords, the master and slave units replacing their stored passwords with the new master and slave unit passwords, respectively, when the combined new master unit passwords matches the combined new slave unit passwords.

3. The system of claim 2 wherein the master units' means for using the access data to derive a plurality of new master unit passwords comprises a plurality of algorithms, means for storing the plurality of algorithms, and means for operating upon the access data with the plurality of algorithms to generate the plurality of new master unit passwords, and the slave units' means for using the access data to derive a plurality of new slave unit passwords comprises the same plurality of algorithms, means for storing the plurality of algorithms and means for operating upon the access data with the algorithms to generate the plurality of new slave unit passwords.

4. The system of claim 3 wherein the master unit further includes means for storing a serial number, the slave unit further including means for storing a serial number of the master unit with which the slave unit is associated, means for comparing the master unit serial number stored in the master unit with the master unit serial number stored in the slave unit, and the master and slave units' means for permitting the remote terminal access to the host computer permitting access when the master unit serial number stored in the master unit matches the master unit serial number stored in the slave unit and the slave unit passwords received by the master unit match the stored master unit passwords and the combined new master unit passwords matches the combined new slave unit passwords.

5. the system of claim 4 wherein the means for comparing the master unit serial number stored in the master unit with the master unit serial number stored in the slave unit comprises one of the master unit and slave unit including means for encoding the master unit serial number stored therein and means for transmitting the encoded serial number to the other of the master unit and slave unit, the other of the master unit and slave unit including means for decoding the serial number it receives and comparing it to the serial number stored therein and sending an acknowledgment of the results of the comparison to the transmitting unit.

6. The system of claim 3 wherein the master unit's means for combining the new master unit passwords comprises means for combining the new master unit passwords to generate a checksum and the slave unit's means for combining the new slave unit passwords comprises means for combining the new slave unit passwords to generate a checksum, and the means for comparing the combined new master unit passwords with the combined new slave unit passwords comprises means for comparing the checksum generated by combining the new master unit passwords with the checksum generated by combining the new slave unit passwords.

7. The system of claim 1 wherein the new master unit passwords and the new slave unit passwords are generated during a log-on sequence wherein the remote terminal is attempting to access the host computer and the master unit passwords and the slave unit passwords comprise the new master unit passwords and the new slave unit passwords, respectively, which were produced by the master unit and slave unit, respectively, during an immediately preceding log-on sequence where the remote terminal successfully obtained access to the host computer.

8. The system of claim 1 wherein the access data comprises a random number.

9. A computer access security system for authorizing access to a host computer from a remote terminal, comprising a master unit coupled to the host computer, a slave unit coupled to the remote terminal, the slave unit including means for storing a plurality of slave unit passwords and a plurality of algorithms, the master unit including means for storing a plurality of master unit passwords and the same plurality of algorithms, the slave unit including means for transmitting each slave unit password to the master unit, the master unit including means for comparing the received slave unit passwords with the stored master unit passwords, one of the slave and master units including means for generating access data upon the successful comparison of the slave unit passwords received by the master unit with the stored master unit passwords and transmitting it to the other of the master and slave units, the master unit including means for operating upon the access data with each of its stored algorithms to derive a plurality of new master unit passwords, the slave unit including means for operating upon the access data with each of its stored algorithms to derive a plurality of new slave unit passwords identical to the new master unit passwords, the master unit having means for combining the new master unit passwords, the slave unit having means for combining the new slave unit passwords, one of the master and slave units having means for transmitting its combined new passwords to the other of the master and slave units, the other of the master and slave units including means for comparing the combined new master unit passwords with the combined new slave unit passwords and sending an acknowledgment of the results of the comparison to the transmitting unit, the master and slave units including means for permitting the remote terminal access to the host computer when the received slave unit passwords match the stored master unit passwords and the combined new master unit passwords matches the combined new slave unit passwords, the master and slave units including means for replacing their stored passwords with the new master and slave unit passwords, respectively, when the combined new master unit passwords matches the combined new slave unit passwords, the new master unit passwords and the new slave unit passwords being generated during a log-on sequence wherein the remote terminal is attempting to access the host computer and the master unit passwords and the slave unit passwords comprise the new master unit passwords and the new slave unit passwords, respectively, which were produced by the master unit and slave unit, respectively, during an immediately preceding log-on sequence where the remote terminal successfully obtained access to the host computer.

10. The system of claim 9 wherein the master unit further includes means for storing a serial number, the slave unit further including means for storing a serial number of the master unit with which the slave unit is associated, means for comparing the master unit serial number stored in the master unit with the master unit serial number stored in the slave unit, and the master and slave units' means for permitting the remote terminal access to the host computer permitting access when the master unit serial number stored in the master unit mataches the master unit serial number stored in the slave unit and the slave unit passwords received by the master unit match the stored master unit passwords and the combined new master unit passwords match the combined new slave unit passwords.

11. The system of claim 10 wherein one of the master unit and slave unit includes means for encoding the master unit serial number stored therein and also includes means for transmitting the encoded serial number to the other of the master unit and slave unit, the other of the master unit and slave unit including means for decoding the serial number it receives and comparing it to the serial number stored therein and sending an acknowledgment of the results of the comparison to the transmitting unit.

12. The system of claim 9 wherein the master unit's means for combining the new master unit passwords comprises means for combining the new master unit passwords to generate a checksum and the slave unit's means for combining the new slave unit passwords comprises means for combining the new slave unit passwords to generate a checksum, and the means for comparing the combined new master unit passwords with the combined new slave unit passwords comprises means for comparing the checksum generated by combining the new master unit passwords with the checksum generated by combining the new slave unit passwords.

* * * * *